United States Patent
Mizuguchi et al.

(10) Patent No.: US 8,888,985 B2
(45) Date of Patent: Nov. 18, 2014

(54) PROCESS FOR PRODUCING RARE METAL

(75) Inventors: Koji Mizuguchi, Kawasaki (JP); Shohei Kanamura, Yokohama (JP); Tetsuo Osato, Shinjuku-Ku (JP); Yuya Takahashi, Kawasaki (JP); Yumi Yaita, Ota-Ku (JP); Yu Yamashita, Yokohama (JP); Reiko Fujita, Nerima-Ku (JP); Takashi Omori, Adachi-Ku (JP); Takashi Yazawa, Ota-Ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 13/527,826

(22) Filed: Jun. 20, 2012

(65) Prior Publication Data
US 2013/0001096 A1    Jan. 3, 2013

(30) Foreign Application Priority Data
Jun. 30, 2011   (JP) ................... 2011-146565

(51) Int. Cl.
| C22B 59/00 | (2006.01) |
| C22B 3/04 | (2006.01) |
| C22B 3/22 | (2006.01) |
| C22B 3/26 | (2006.01) |
| C22B 3/46 | (2006.01) |
| C25C 3/34 | (2006.01) |
| C22B 3/42 | (2006.01) |
| C22B 61/00 | (2006.01) |

(52) U.S. Cl.
CPC .......... C22B 3/0005 (2013.01); C25C 3/34 (2013.01); C22B 3/42 (2013.01); C22B 3/46 (2013.01); C22B 59/00 (2013.01); C22B 61/00 (2013.01)

USPC .......................................... 205/368

(58) Field of Classification Search
USPC .......................................... 205/368
See application file for complete search history.

(56) References Cited

U.S. PATENT DOCUMENTS

| 2,634,280 | A | * | 4/1953 | Tribalat et al. ............... 534/10 |
| 2,945,743 | A |   | 7/1960 | Zimmerley et al. |
| 3,260,658 | A | * | 7/1966 | Churchward ............ 205/565 |
| 3,891,521 | A | * | 6/1975 | Carlin .................... 205/560 |

(Continued)

FOREIGN PATENT DOCUMENTS

CN        101780970 A       7/2010

OTHER PUBLICATIONS

Lyman et al, Recycling of Neodymium Iron Boron Scrap, United States Department of the Interior—Bureau of Mines, Report of Investigations 9481, 1993, pp. 1-27.*

(Continued)

*Primary Examiner* — Harry D Wilkins, III
(74) *Attorney, Agent, or Firm* — Oblon, Spivak, McClelland, Maier & Neustadt, L.L.P.

(57) ABSTRACT

According to one embodiment, a process for producing rare metals includes the steps of: recovering a first-residue solution through a primary target metal extracted by leaching a mineral resource; extracting a perrhenic acid ion contained in the first-residue solution with at least one of an anion exchange resin and a first-organic solvent; back extracting the perrhenic acid ion contained in the anion exchange resin or the first-organic solvent to a first-eluant; and electrolyzing the back extracted first-eluant to collect a rhenium at a cathode.

7 Claims, 6 Drawing Sheets

(56) References Cited

U.S. PATENT DOCUMENTS

| | | | |
|---|---|---|---|
| 5,429,724 A * | 7/1995 | Greenberg | 205/560 |
| 5,728,355 A * | 3/1998 | Asada | 423/21.1 |
| 5,961,938 A * | 10/1999 | Yamamoto | 423/21.1 |
| 5,980,841 A * | 11/1999 | Yamamoto | 423/21.1 |
| 2010/0314260 A1 | 12/2010 | Fujita et al. | |
| 2010/0319491 A1 * | 12/2010 | Sugahara et al. | 75/743 |

OTHER PUBLICATIONS

Churchward et al, Sources and Recovery Methods for Rhenium, United States Department of the Interior—Bureau of Mines, Report of Investigations 6246, 1963, pp. 1-16.*

Office Action issued Sep. 12, 2013 in Canadian Application No. 2,781,238.

* cited by examiner

US 8,888,985 B2

PROCESS FOR PRODUCING RARE METAL

CROSS-REFERENCE TO RELATED APPLICATIONS

This application is based upon and claims the benefit of priority from Japanese Patent application No. 2011-146565, filed on Jun. 30, 2011, the entire contents of each of which are incorporated herein by reference.

FIELD

Embodiments described herein relate generally to a process for producing rare metal using a residue solution as raw materials, the residue solution obtained through primary target metal extracted by leaching a mineral resource.

BACKGROUND

Rhenium (Re) is a particularly rare metal among rare metals, and is used to reinforce turbine materials for aircrafts, for example.

Rare-earth metal (RE) is used as materials, such as a hydrogen storing metal alloy, rechargeable battery materials, optical glass, a powerful rare-earth permanent magnet, a fluorescent substance, and an abradant, for example.

There is a prior art disclosing that extracting rhenium metal and the rare-earth metal (neodymium, dysprosium) separately at a series of processes from the residue solution as raw material, the residue solution obtained through primary target metal extracted by leaching a mineral resource (for example, Japanese Unexamined Patent Application No. JP-A-2010-285680).

Unfortunately, the process in the prior art, if impurities such as Fe and Al are contained in the residue solution, prevent the rare-earth metals from their proper separate extraction.

The present invention was made in consideration of such a situation, introducing the step of removing the impurities in residue solution, and providing the process for producing rare metal having high robustness to solution composition.

DETAILED DESCRIPTION (A First Embodiment)

Hereafter, the embodiment of the present invention is described based on an accompanying drawing.

Figure 1:
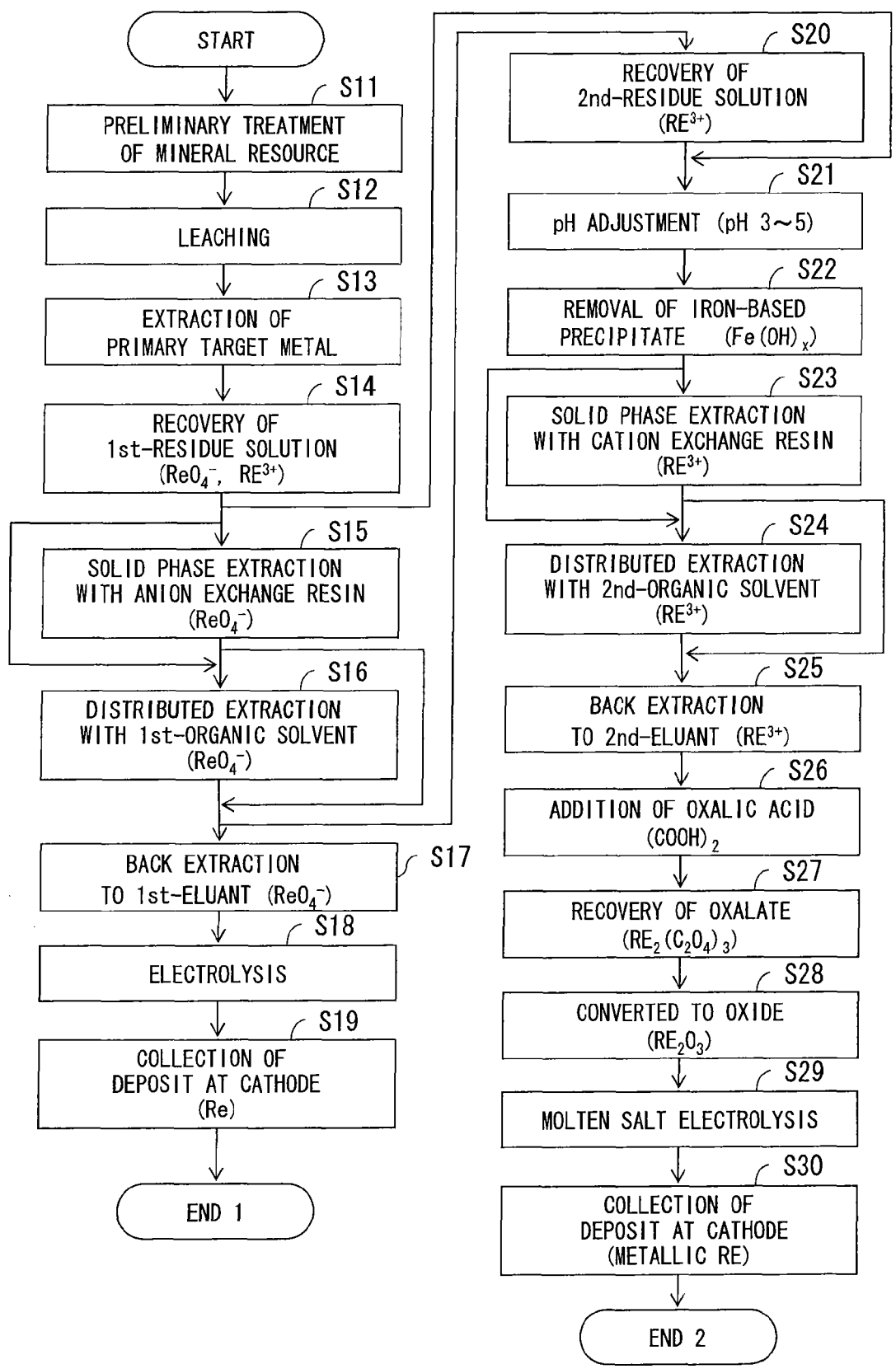
FIG. 1 is a flow chart showing a first embodiment of the process for producing rare metal according to the present invention.

As shown in FIG. 1, a process for producing rare metals according to a first embodiment includes the steps of: recovering a first-residue solution through a primary target metal extracted by leaching a mineral resource (S11-S14); extracting a perrhenic acid ion ($ReO_4^-$) contained in the first-residue solution with at least one of an anion exchange resin and a first-organic solvent (S15, S16); back extracting the perrhenic acid ion ($ReO_4^-$) contained in the anion exchange resin or the first-organic solvent to a first-eluant (S17); and electrolyzing the back extracted first-eluant (S18) to collect a rhenium (Re) at a cathode (S19).

In the Step (S11) the mineral resource is subjected to preliminary treatment (crushing, concentrating, roasting), and then leached with an acid or alkaline solution (S12).

In the Step (S13) the primary target metal means uranium, copper, or molybdenum in this embodiment, but it is not limited to these.

In the Step (S14) the first-residue solution contains the rare earth metal ion ($RE^{3+}$), besides the perrhenic acid ion ($ReO_4^-$) and further containing variety of impurity metal ion such as Fe, Al, Ca, and Mg.

In this embodiment, the rare-earth metal means the element located by the fourth to sixth period among the third group in the periodic table, such as Sc (scandium), Y (yttrium), La (lantern), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium), and Lu (lutetium).

These elements have the character which grows into a trivalent positive ion easily.

In the Step (S15) the anion exchange resin with which the perrhenic acid ion ($ReO_4^-$) is extracted in solid phase. As shown in a following formula (1), the anion exchange resin has an ion-exchange group (fixed ion [—N $(CH_3)^+$] is an example) fixed to the body R, forming ionic bond with the exchangeable mobile ion currently (counter ion [$OH^-$] is an example).

Then if the anion exchange resin absorbs the negative ion ($ReO_4^-$ in this case) contained in the first-residue solution, counter ion ($OH^-$ in this case) will be emitted instead to the first-residue solution.

$$R\text{—}N(CH_3)_3^+ + OH^- \tag{1}$$

In the Step (S16) the first-organic solvent with which the perrhenic acid ion ($ReO_4^-$) is extracted by distribution ratio. The first-organic solvent and the first-residue solution do not dissolve each other that two-phase separation is carried out. Furthermore the solubility of perrhenic acid ion ($ReO_4^-$) differs between the first-organic solvent and the first-residue solution, respectively. For this reason, if the boundary motion of the perrhenic acid ion ($ReO_4^-$) balanced in an equilibrium state, the perrhenic acid ion ($ReO_4^-$) will be distributed to the first-organic solvent and the first-residue solution at a fixed rate.

By using the first-organic solvent with a large distribution coefficient, perrhenic acid ion ($ReO_4^-$) is efficiently extractable (concentrate) from the first-residue solution.

One case only either step may be carried out among the step (S15) solid phase extraction of $ReO_4^-$ with the anion exchange resin or the step (S16) distributed extraction of $ReO_4^-$ with the first-organic solvent and other case both steps may be carried out continuously to promote condensing. Generally, the extraction with ion exchange resin is effective when condensing the low-concentration ion in the first-residue solution, and the extraction with an organic solvent is effective if the ion concentration is higher than the ion exchange resin's case.

In the Step (S17) back extraction to the first-eluant, the perrhenic acid ion (ReO$_4$-) contained in the anion exchange resin or the first-organic solvent distributes to the first-eluant.

Therefore, the material of the first-eluant and the method of the back extraction are different whether which step are carried out among the step (S15) solid phase extraction of ReO$_4$- with the anion exchange resin or the step (S16) distributed extraction of ReO$_4$- with the first-organic solvent. In case both steps (S15) (S16) are carried out continuously, the step (S17) back extraction to the first-eluant exists between (S15) and (S16), although illustration is omitted.

In the Step (S18) the electrolysis vessel holds the first-eluant containing the condensed perrhenic acid ion (ReO$_4$-) to adjust electrolytic concentration and then the electrodes inserted to impress direct-current power. If the halogen gas may generate at the anode in this case, the halogen gas generation can be controlled by adopting a DSE (Dimensionally Stable Electrodes).

The process for producing rare metals, after the steps of (S11)-(S16), further includes the step of: recovering a second-residue solution the perrhenic acid ion (ReO$_4$-) extracted from the first-residue solution (S20); adjusting a potential-hydrogen of the second-residue solution within a range of pH 3 or higher and lower than pH 5 to generate a precipitate (S21) and then removing the precipitate (Fe(OH)$_x$) (S22); extracting a rare-earth metal ion (RE$^{3+}$) with at least one of a cation exchange resin and a second-organic solvent from the second-residue solution in which the precipitate (Fe(OH)$_x$) removed (S23, S24); back extracting the rare-earth metal ion (RE$^{3+}$) contained in the cation exchange resin or the second-organic solvent to a second-eluant (S25); adding an oxalic acid ((COOH)$_2$) in the back extracted second-eluant (S26) to precipitate a rare-earth metal oxalate (RE$_2$(C$_2$O$_4$)$_3$); recovering the rare-earth metal oxalate (RE$_2$(C$_2$O$_4$)$_3$) (S27) and then converting into a rare-earth metal oxide (RE$_2$O$_3$) (S28); and electrolyzing the rare-earth metal oxide (RE$_2$O$_3$) in a molten salt (S29) to collect a rare-earth metal at a cathode (S30).

In addition, it is possible processing the first-residue solution directly in the steps of (S21)-(S30), omitting the steps (S15)-(S20) among the steps (S11)-(S20) mentioned above.

In the Step (S21) potential-hydrogen adjustment of the second-residue solution (or the first-residue solution) within a range of pH 3 or higher and lower than pH 5 by an alkali (ammonia aqueous solution etc.) supplied. The preferable potential-hydrogen range is within pH 3.5 to pH 4. If the potential-hydrogen of the second-residue solution less than pH 3 causes insufficient precipitation of impurity Fe ion for remove, and pH 5 or higher causes precipitation of the rare-earth metal ion (RE$^{3+}$) for collection.

In the Step (S23) the cation exchange resin with which the rare-earth metal ion (RE$^{3+}$) is extracted in solid phase. As shown in a following formula (2), the cation exchange resin has an ion-exchange group (fixed ion [—SO$^{3-}$] is an example) fixed to the body R, forming ionic bond with the exchangeable mobile ion currently (counter ion [H$^+$] is an example).

Then if the cation exchange resin absorbs the positive ion (RE$^{3+}$ in this case) contained in the second-residue solution, counter ion (H$^+$ in this case) will be emitted instead to the second-residue solution.

$$R\text{—}SO^{3-}+3H^+ \quad (2)$$

In the Step (S24) the second-organic solvent with which the rare-earth metal ion (RE$^{3+}$) is extracted by distribution ratio. The second-organic solvent (or first-organic solvent) and the second-residue solution do not dissolve each other that two-phase separation is carried out. Furthermore the solubility of rare-earth metal ion (RE$^{3+}$) differs between the second-organic solvent and the second-residue solution, respectively. For this reason, if the boundary motion of the rare-earth metal ion (RE$^{3+}$) balanced in an equilibrium state, the rare-earth metal ion (RE$^{3+}$) will be distributed to the second-organic solvent and the second-residue solution at a fixed rate.

By using the second-organic solvent with a large distribution coefficient, rare-earth metal ion (RE$^{3+}$) is efficiently extractable (concentrate) from the second-residue solution.

One case only either step may be carried out among the step (S23) solid phase extraction of RE$^{3+}$ with the cation exchange resin or the step (S24) distributed extraction of RE$^{3+}$ with the second-organic solvent and other case both steps may be carried out continuously to promote condensing.

In the Step (S25) the second-eluant carries out back extraction, the rare-earth metal ion (RE$^{3+}$) contained in the cation exchange resin or the second-organic solvent distributes to the second-eluant.

Therefore, the material of the second-eluant and the method of the back extraction are different whether which step are carried out among the step (S23) solid phase extraction of RE$^{3+}$ with the cation exchange resin and the step (S24) distributed extraction of RE$^{3+}$ with the second-organic solvent. In case both steps (S23) (S24) are carried out continuously, the step (S25) back extraction to the second-eluant exists between (S23) and (S24), although illustration is omitted.

In the Step (S26) (S27) oxalic acid ((COOH)$_2$) is added to the second-eluant in which rare-earth metal ion (RE$^{3+}$) is contained, rare-earth metal oxalate (RE$_2$(C$_2$O$_4$)$_3$) will precipitate. These precipitated rare-earth metal oxalate (RE$_2$(C$_2$O$_4$)$_3$) is recovered by filtration.

In the Step (S28) the recovered rare-earth metal oxalate (RE$_2$(C$_2$O$_4$)$_3$) converts into a rare-earth metal oxide (RE$_2$O$_3$) by drying and baking.

In the Step (S29) (S30) together with salt the converted rare-earth metal oxide (RE$_2$O$_3$) is carried out molten salt electrolysis to collect the rare-earth metal (RE) at cathode.

As such the salt used for molten salt electrolysis, it is the combination of halogenide such as chloride, fluoride, iodide of alkaline metals such as Li, Na, K, Cs, Rb and of alkaline-earth metals such as Ca, Mg, Be, Sr, Ba, Ra.

At this time, generating of the halogen gas at the anode is controlled by mixing the oxide of alkaline metals such as Li, Na, K, Cs, Rb and of alkaline-earth metals such as Ca, Mg, Be, Sr, Ba, Ra.

Figures 2A, 2B:
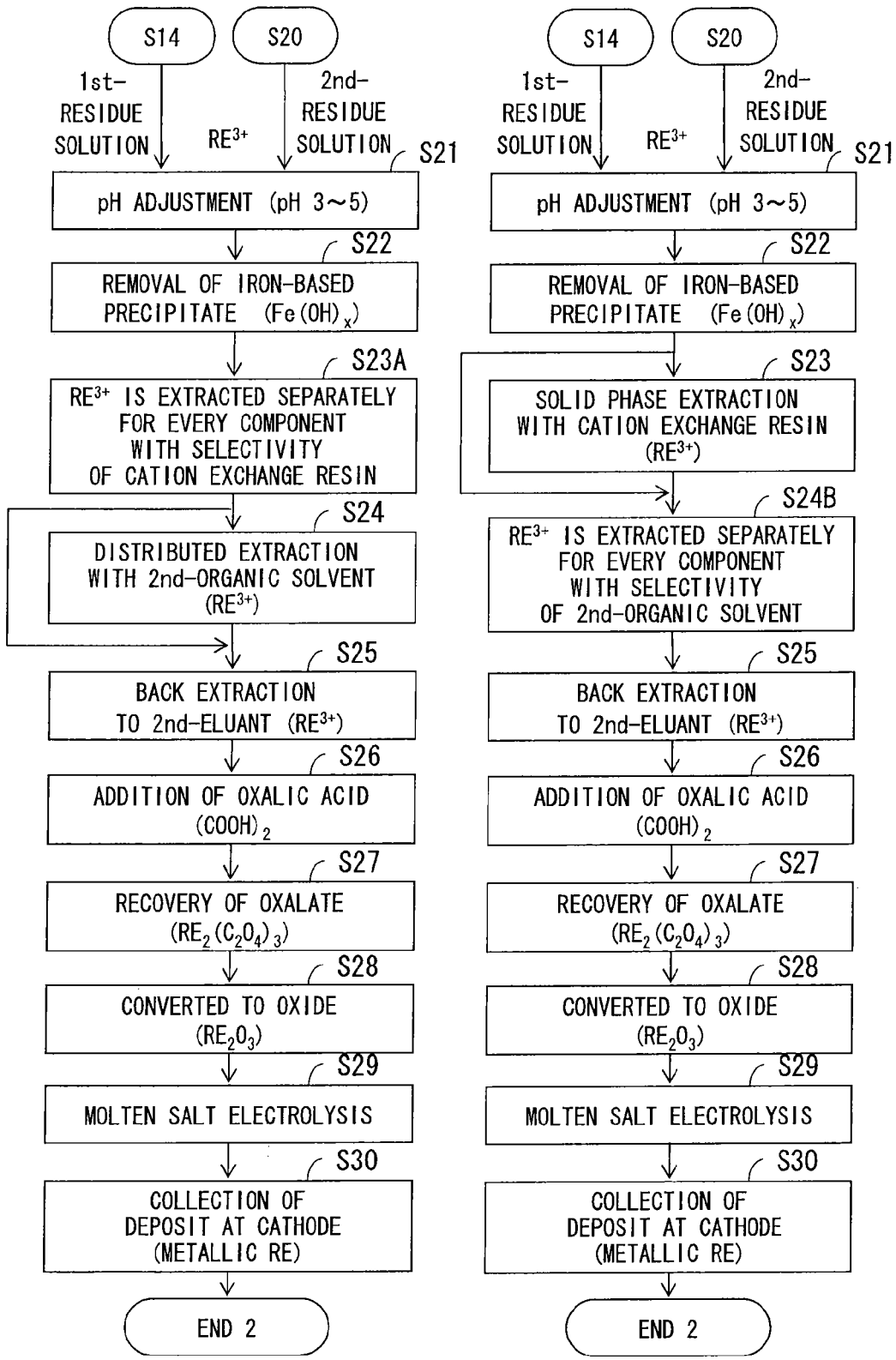
FIG. 2(A) and FIG. 2(B) are flow chart showing an extraction of various types of the rare-earth metal separately containing in the residue solution according to the first embodiment.

FIG. 2 shows the first embodiment of the process for producing rare metal wherein the residue solution contains various types of the rare-earth metal ion (RE$^+$).

That is, in the back process of the step (S22) removal of iron-based precipitate (Fe(OH)$_x$), the steps (S23A, S24B) either one of the cation exchange resin and the second-organic solvent having selectivity for various types of the rare-earth metal ion (RE$^{3+}$) to extract separately for each component.

In the step (S23A) of FIG. 2 (A), various types of the rare-earth metal ion (RE$^{3+}$) are separated for each component using different cation exchange resin which has ion selectivity. In the Step (S25) each rare-earth metal ion ($RE^{3+}$) contained in different cation exchange resin respectively extracted to the second-eluant separately. Furthermore carrying out the step (S24) distrubuted extraction with second-organic solvent, it is possible to condense each rare-earth metal ion ($RE^{3+}$).

The subsequent steps (S26)-(S30) are carried out on each second-eluant back extracted respectively.

In the step (S24B) of FIG. 2 (B), various types of the rare-earth metal ion ($RE^{3+}$) are separated for each component using different second-organic solvent which has ion selectivity. In the Step (S25) each rare-earth metal ion ($RE^{3+}$) contained in different second-organic solvent respectively extracted to the second-eluant separately. Furthermore, the step (S24) may be carried out in advance, for condensing rare-earth metal ions ($RE^{3+}$) all together.

The subsequent steps (S26)-(S30) are carried out on each second-eluant back extracted respectively.

Figure 3:
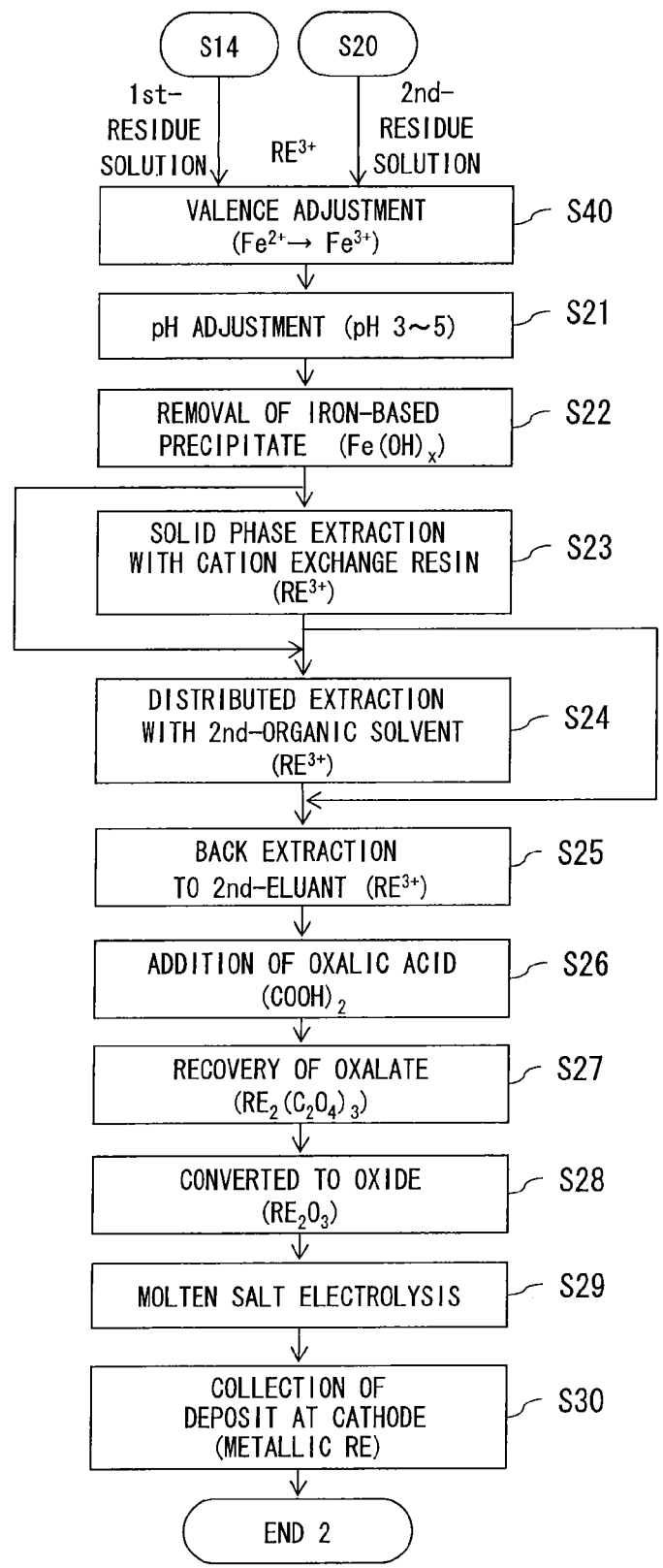
FIG. 3 is a flow chart having a step of adjusting a valence of an impurity Fe-ion in the residue solution according to the first embodiment.

FIG. 3 shows the first embodiment added the step (S40) valence adjustment of an impurity iron ion, before the step (S21) potential-hydrogen adjustment of the second-residue solution within the range of pH 3 or higher and lower than pH 5.

Specifically, in the step (S40) babbling the second-residue solution by oxidizers, such as air and hydrogen peroxide solution to adjust the valence of the iron ion changes into $Fe^{3+}$ from $Fe^{2+}$.

(A Second Embodiment)

Figure 4:
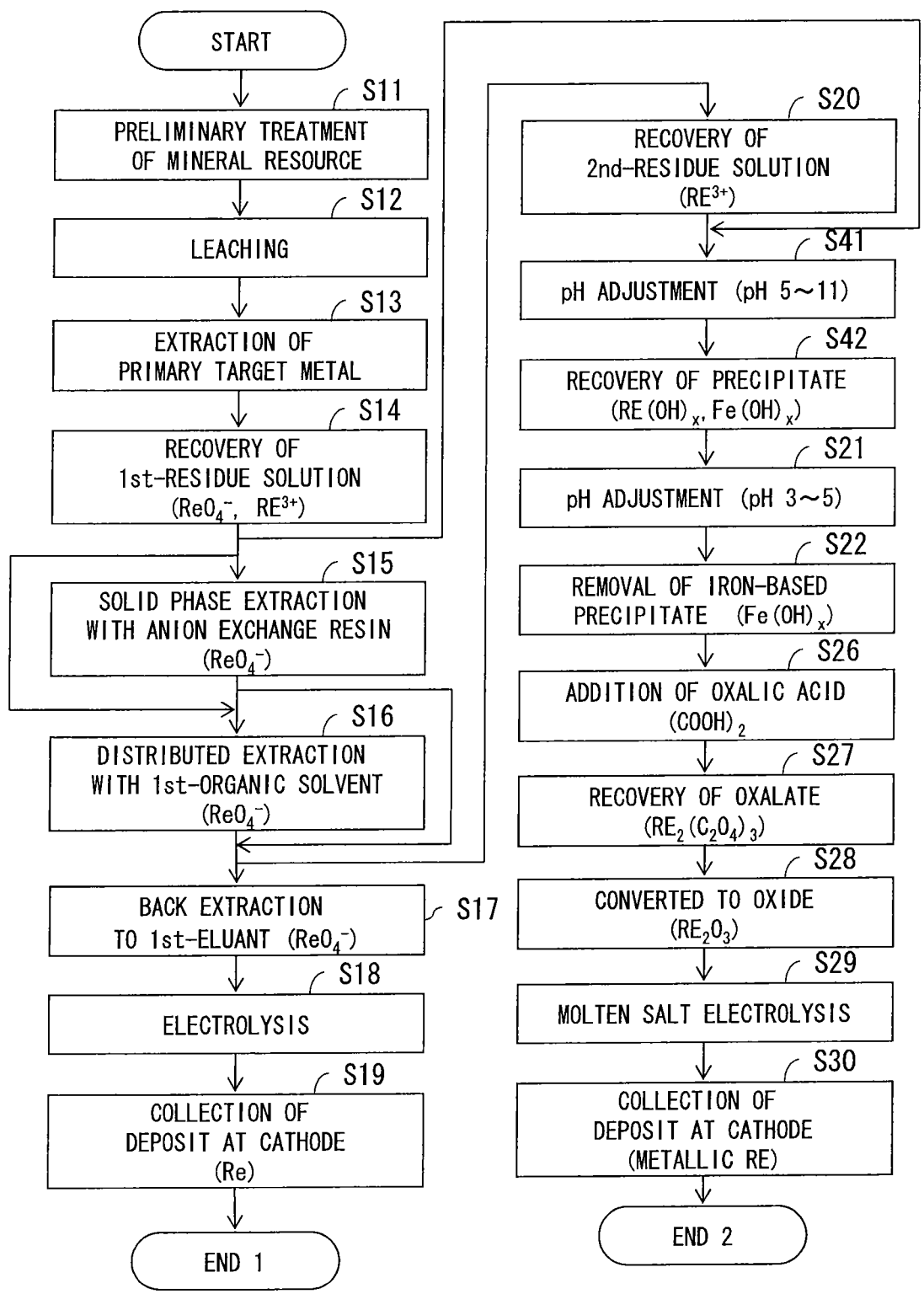
FIG. 4 is a flow chart showing a second embodiment of the process for producing rare metal according to the present invention.

With reference to a flow chart in FIG. 4 a second embodiment of process for producing rare metals will be described. Steps S11 to S19 in the second embodiment are the same as those in the first embodiment, and description thereof will be omitted by citation of the description already given. Also in the step of (S20) or subsequent steps, described in FIG. 4, same reference numerals will be given to steps common to those described in FIG. 1, and description thereof will be omitted by citation of the above-mentioned description.

The process for producing rare metals according to second embodiment, after through the steps (S11)-(S16), further includes steps: recovering a second-residue solution the perrhenic acid ion ($ReO_4-$) extracted from the first-residue solution (S20); adjusting potential-hydrogen of the second-residue solution within a range of pH 5 or higher and lower than pH 11 to generate a precipitate (S41), and then recovering the precipitate ($RE(OH)_x$, $Fe(OH)_x$) (S42); adjusting the recovered precipitate ($RE(OH)_x$, $Fe(OH)_x$) in an aqueous solution within a range of pH 3 or higher and lower than pH 5 (S21) and then removing a residual-precipitate ($Fe(OH)_x$) (S22); adding an oxalic acid (($COOH)_2$) in the aqueous solution ($RE^{3+}$) the residual-precipitate ($Fe(OH)_x$) removed (S26) to precipitate a rare-earth metal oxalate ($RE_2(C_2O_4)_3$); recovering the rare-earth metal oxalate ($RE_2(C_2O_4)_3$) (S27) and then converting into a rare-earth metal oxide ($RE_2O_3$) (S28); and electrolyzing the rare-earth metal oxide ($RE_2O_3$) in a molten salt (S29) to collect a rare-earth metal (RE) at a cathode (S30).

Above mentioned the steps of (S15)-(S20) can be omitted among the steps of (S11)-(S20), and the first-residue solution can be direct processing at the steps of (S41) (S42) (S21)-(S30).

In the step (S41) potential-hydrogen adjustment of the second-residue solution (or the first-residue solution) within a range of pH 5 or higher and lower than pH 11 by alkali supplied. The preferable potential-hydrogen range is within pH 6 to pH 8. If the potential-hydrogen of the second-residue solution is the range of lower than pH 5 or pH 11 or higher causes insufficient precipitation of the rare-earth metal ion ($RE^{3+}$).

In the step (S42) recovery of precipitates ($RE(OH)_x$, $Fe(OH)_x$), the precipitates contains $Fe(OH)_x$ as an impurity besides $RE(OH)_x$ as a target for recovery. Other impurities of Ca ion and Mg ion are remain in the liquid phase, and then removed.

The subsequent steps (S21)-(S30), removing Fe and then extracting a rare-earth metal (RE).

FIG. 5 shows the process for producing rare metal having a step of removing aluminum of impurities.

It is assumed where aluminum of impurities is mixed in the recovered precipitate ($RE(OH)_x$, $Fe(OH)_x$) at the step (S42).

Figure 5A:
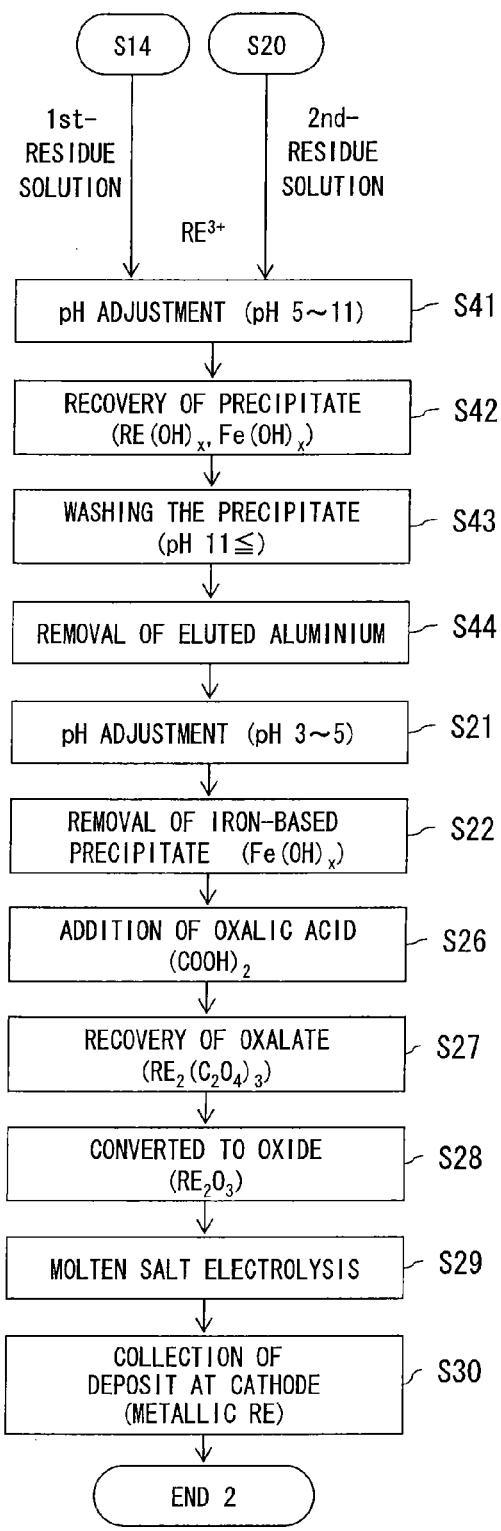
FIG. 5(A) is a flow chart having a step of removing an impurity Al in the residue solution according to the second embodiment.

In FIG. 5(A), the process for producing rare metals, before the step of (S21), further includes the steps of: washing the recovered precipitate (RE $(OH)_x$, $Fe(OH)_x$) in an aqueous solution adjusted a potential-hydrogen pH 11 or higher (S43), to remove an eluted aluminum (S44).

Figure 5B:
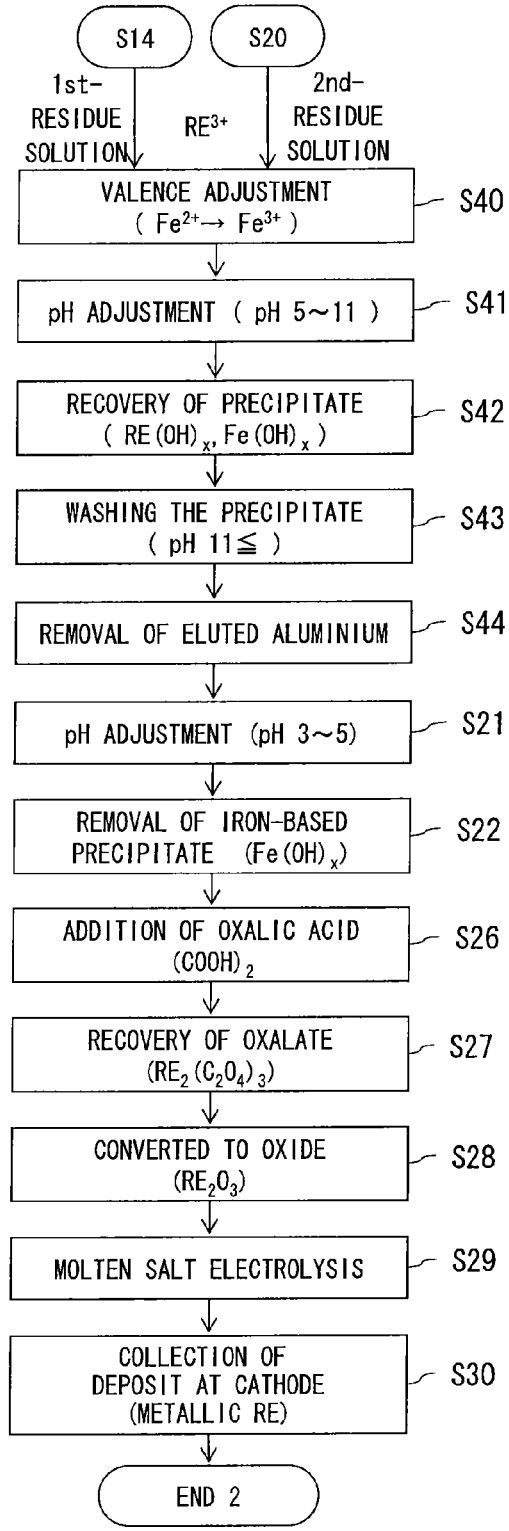
FIG. 5(B) is a flow chart further having a step of removing an impurity Fe.

In FIG. 5(B), the process for producing rare metal, further includes the steps of: adjusting a valence of an impurity iron ion (S40), before the step of (S41) adjusting potential-hydrogen of the second-residue solution within the range of pH 5 or higher and lower than pH 11.

In the step (S43), although the potential-hydrogen adjusted pH 11 or higher, it is more prefer the potential-hydrogen adjusted pH14 or higher. If the potential-hydrogen adjusted lower than pH11, it may become insufficient for dissolving and removing of aluminum of the impurities contained in the recovered precipitate.

Figure 6:
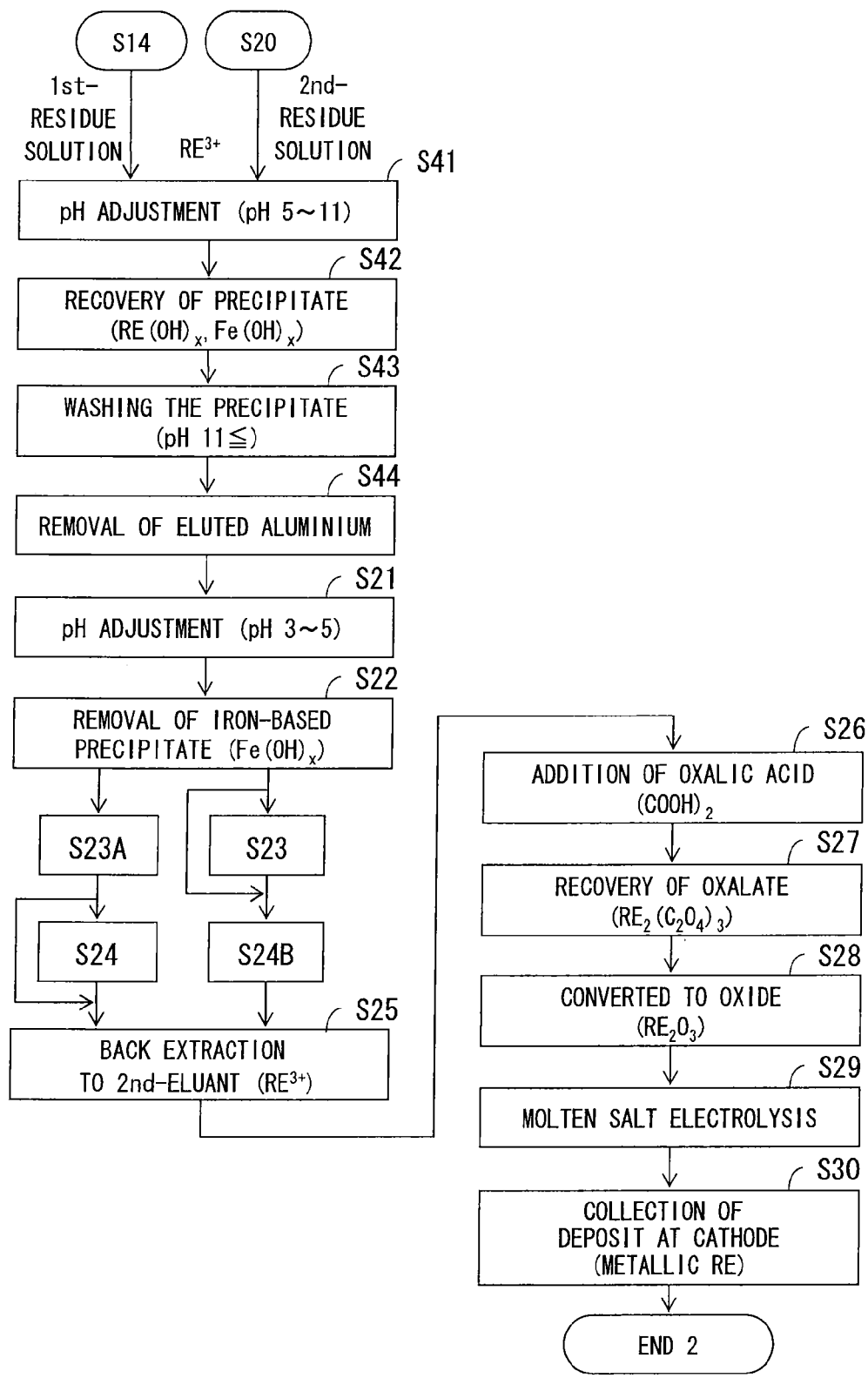
FIG. 6 is a flow chart showing extraction of various types of the rare-earth metal separately containing in the residue solution according to the second embodiment.

FIG. 6 shows the process for producing rare metals according to the second embodiment, before the step of the adding an oxalic acid (S26); further comprising the step of: extracting the rare-earth metal ion ($RE^{3+}$) separately for each component with at least one of a cation exchange resin and a second-organic solvent having selectivity for various types of the rare-earth metal ion ($RE^{3+}$) contained in the aqueous solution in which the residual-precipitate ($Fe(OH)_x$) removed (S23A, S23B); and back extracting the rare-earth metal ion ($RE^{3+}$) contained in the cation exchange resin or the second-organic solvent to the second-eluant (S25).

In the step (S23A), various types of the rare-earth metal ion ($RE^{3+}$) dissolved in the solution are separated for each component using different cation exchange resin which has ion selectivity. In the Step (S25) each rare-earth metal ion ($RE^{3+}$) contained in different cation exchange resin respectively, extracted to the second-eluant separately. Furthermore carrying out the step (S24) distrubuted extraction with second-organic solvent, it is possible to condense each rare-earth metal ion ($RE^{3+}$).

In the step (S24B), various types of the rare-earth metal ion ($RE^{3+}$) dissolved in the solution are separated for each component using different second-organic solvent which has ion selectivity. In the Step (S25) each rare-earth metal ion ($RE^{3+}$) contained in different second-organic solvent respectively, extracted to the second-eluant separately. Furthermore, the step (S24) may be carried out in advance, for condensing rare-earth metal ions ($RE^{3+}$) all together.

The subsequent steps (S26)-(S30) are carried out on each back extracted second-eluant respectively.

While certain embodiments have been described, these embodiments have been presented by way of example only, and are not intended to limit the scope of the inventions. Indeed, the novel process and system described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A process for producing a rare-earth metal, the process comprising:

leaching a mineral source with a solution to obtain a first residual solution comprising a primary target rare-earth metal;

adjusting a pH level of the first residual solution to within a range of pH 3 or higher and lower than pH 5 to generate a precipitate, and then removing the precipitate from the first residual solution to obtain a second residual solution;

extracting a rare-earth metal ion with at least one of a cation exchange resin and an organic solvent from the second residual solution;

back extracting the rare-earth metal ion contained in the cation exchange resin or the organic solvent to obtain an eluant;

adding an oxalic acid to the eluant to precipitate a rare-earth metal oxalate;

recovering the rare-earth metal oxalate, and then converting the rare-earth metal oxalate into a rare-earth metal oxide; and electrolyzing the rare-earth metal oxide in a molten salt to collect a rare-earth metal at a cathode.

2. The process according to claim 1,
wherein the at least one of the cation exchange resin and the organic solvent has selectivity for a target rare-earth metal ion.

3. The process according to claim 1, further comprising:
adjusting a valence of an impurity comprising an iron ion before the adjusting.

4. A process for producing a rare-earth metal, the process comprising:

leaching a mineral source with a solution to obtain a residual solution comprising a primary target rare-earth metal;

adjusting a pH level of the residual solution to within a range of pH 5 or higher and lower than pH 11 to generate precipitate, and then recovering the precipitate from the residual solution to obtain a recovered precipitate;

adding the recovered precipitate to a first aqueous solution;

adjusting a pH level of the first aqueous solution to within a range of pH 3 or higher and lower than pH 5, thereby forming a residual-precipitate;

removing the residual-precipitate from the first aqueous solution, thereby obtaining the second aqueous solution;

adding an oxalic acid to the second aqueous solution to precipitate a rare-earth metal oxalate;

recovering the rare-earth metal oxalate, and then converting the rare-earth metal oxalate into a rare-earth metal oxide; and electrolyzing the rare-earth metal oxide in a molten salt to collect a rare-earth metal at a cathode.

5. The process according to claim 4, further comprising:
washing the recovered precipitate with a third aqueous solution adjusted to pH 11 or higher, before adding the recovered precipitate to the first aqueous solution.

6. The process according to claim 4, further comprising:
adjusting a valence of an impurity comprising an iron ion, before the adjusting the pH level of the residual solution.

7. The process according to claim 4, before the adding the oxalic acid, the process further comprising:

extracting the rare-earth metal ion separately for each component with at least one of a cation exchange resin and an organic solvent having selectivity for a target rare-earth metal ion from the second aqueous solution; and back extracting the rare-earth metal ion contained in the cation exchange resin or the organic solvent to obtain an eluant.

* * * * *